United States Patent
Englert

(10) Patent No.: US 6,722,679 B2
(45) Date of Patent: Apr. 20, 2004

(54) VEHICLE MOUNTED LIQUID DISPENSING ASSEMBLY

(75) Inventor: Timothy P. Englert, St. Petersburg, FL (US)

(73) Assignee: Time Design Inventions, Inc., St. Petersburg, FL (US)

( * ) Notice: Subject to any disclaimer, the term of this patent is extended or adjusted under 35 U.S.C. 154(b) by 0 days.

(21) Appl. No.: 10/191,819

(22) Filed: Jul. 9, 2002

(65) Prior Publication Data
US 2004/0036252 A1 Feb. 26, 2004

(51) Int. Cl.[7] ............................................. B62J 39/00
(52) U.S. Cl. .................. 280/288.4; D21/572; D12/114; 222/610; 239/154
(58) Field of Search ............................. 280/288.4, 201; D21/572, 720, 814; D12/114; 446/473, 475; 224/412, 414, 476; 222/610, 614; 220/705; 239/154, 152, 289

(56) References Cited

U.S. PATENT DOCUMENTS

| | | |
|---|---|---|
| 1,387,352 A | 8/1921 | Clark |
| 2,667,720 A | 2/1954 | Connell, Jr. |
| 3,142,200 A | 7/1964 | Stillman et al. |
| 3,677,446 A | 7/1972 | Guyer, Jr. et al. |
| 4,095,812 A | 6/1978 | Rowe |
| 4,150,681 A | 4/1979 | Howarth, Jr. |
| 4,274,566 A | 6/1981 | Rowe |
| 4,807,813 A | 2/1989 | Coleman |
| 5,143,390 A | 9/1992 | Goldsmith |
| 5,201,442 A * | 4/1993 | Bakalian ...................... 222/610 |
| D381,711 S | 7/1997 | Englert |
| 5,735,440 A | 4/1998 | Regalbuto |
| 6,145,695 A * | 11/2000 | Garrigues .................... 220/705 |
| 6,196,474 B1 * | 3/2001 | Hillerson .................... 239/289 |

FOREIGN PATENT DOCUMENTS

DE          29914831 U1 *  3/2000  ........... A62C/27/00

* cited by examiner

Primary Examiner—Lesley D. Morris
Assistant Examiner—Daniel Yeagley
(74) Attorney, Agent, or Firm—Malloy & Malloy, P.A.

(57) ABSTRACT

A liquid dispensing assembly structured to be permanently or removably mounted on a bicycle or variety of other types of vehicles comprising an array of "squirt guns" more specifically defined by selectively operable nozzle assemblies. A control assembly is structured to operate one or more of the aforementioned nozzle assemblies and includes hand operated activating and positioning devices, remotely disposed from the nozzle assemblies and structured to accomplish concurrent or independent activation of the one or more nozzle assemblies and the selective positioning of at least one of the nozzle assemblies, such that streams of water may be directed outwardly from the vehicle in a variety of different directions.

34 Claims, 6 Drawing Sheets

VEHICLE MOUNTED LIQUID DISPENSING ASSEMBLY

BACKGROUND OF THE INVENTION

1. Field of the Invention

The present invention is directed to a liquid dispensing assembly including an array of "squirt" guns or nozzle members mounted on a bicycle or other type of recreational vehicle, wherein a plurality of liquid streams may be directed outwardly from the vehicle selectively and in a variety of different directions.

2. Description of the Related Art

The bicycle, as well as other cycle type vehicles have enjoyed exceptional popularity with people of all ages for many years. While initially intended as a primary source of transportation, before the popularity of the motor vehicle, the bicycle, at least in the United States, is now primarily used for recreational purposes. Naturally, over the years the bicycle has improved both structurally and operationally and is available in a variety of different designs and models. Further, customization of the bicycle allowed the development of structural components which serve to specialize or categorize the various bicycle models for specific types of use, such as for racing, operation over rough terrain, general exercise, as well as for use in a variety of competitive sports activities.

Somewhat similarly, devices commonly known as "squirt guns" or "water guns" have been known and utilized, primarily by children, for many years. Conventionally, such devices are relatively small, hand held and manually operated by a trigger activated pumping mechanism built into the gun structure itself. Over the years, the squirt gun, like the bicycle has developed both structurally and operationally to the extent that the associated technology has served to increase the range, amount and duration of water being projected, utilizing the more modern squirt gun devices. Still, some limiting problems or disadvantages exist due, at least in part, to the limited water capacity contained within or associated with the modern day squirt gun. It is commonly recognized that water is a relatively heavy commodity especially when a quantity thereof is expected to be carried on or about ones person. Further problems associated with leakage of a storage container for the water and structured to deliver the stored water to the squirt gun, are also sometimes problematic. Therefore, the larger models of water or squirt guns may sometimes restrict the mobility and comfort of the user resulting in fatigue and/or the inability of younger individuals to operate and/or carry such devices.

The popularity of both the bicycle and the water gun and the fact that both of these types of devices are intended for outdoor use, have resulted in numerous attempts to combine their operation. Accordingly, numerous devices have been designed which comprise the mounting of one or more liquid delivering devices on some portion of a bicycle, tricycle or other type of recreational vehicle.

In a more simplistic form, conventional hand carried water guns are affixed to the frame of a bicycle and operated independently of the vehicle in terms of being activated by a trigger controlled pumping mechanism contained within the water gun itself. More sophisticated devices include one or more water or liquid jet issuing structures mounted on various portions of a cycle-type vehicle or alternatively on helmets or other operator supported devices. The fact that problems and disadvantages exist with many of the known attempts to combine water guns and cycle-type vehicles is evidenced by the fact that few if any such devices are commercially available on a wide spread basis.

Therefore, there is a recognized need in the outdoor recreational market for a water dispensing assembly capable of being fixedly and/or removably mounted on a bicycle or other type of vehicle wherein use of the liquid dispensing assembly is effective, efficient and can be accomplished concurrently with the operation of the vehicle without requiring significant repositioning of an operator's hands or other portions of his or her body. Further, the structural efficiency of the various operative components of such a preferred liquid distribution assembly should be such as to allow the vehicle operator to selectively and repeatedly activate one or more nozzle assemblies in order to create a plurality of liquid streams issuing from the supporting vehicle. An additional benefit may be achieved by allowing the vehicle operator to selectively position the one or more nozzle assemblies in any of a plurality of different and varied, preselected directions.

SUMMARY OF THE INVENTION

The present invention is directed to a liquid dispensing assembly primarily, but not exclusively, adapted to be mounted on a cycle-type vehicle, such as a bicycle, tricycle, or other velocipede. More specifically, the liquid dispensing assembly comprises an array of "squirt" or "water" guns. The array of squirt guns may be more accurately described as at least one, but preferably a plurality of nozzle assemblies, wherein each nozzle assembly may include at least one but preferably two nozzle members. Further, the one or more nozzle members associated with each nozzle assembly is cooperatively structured with other operative components of the liquid dispensing assembly of the present invention, to selectively issue or direct streams of water outwardly from the vehicle, on which the dispensing assembly is mounted, in any of a plurality of different, selectable directions.

While at least one preferred embodiment of the present invention comprises the various operative components of the dispensing assembly being removably mounted on a vehicle it is contemplated that the dispensing assembly can be produced and/or assembled as an OEM product, wherein the bicycle or other vehicle comes equipped with the dispensing assembly. However, structural features of at least one preferred embodiment demonstrates an enhanced versatility by allowing the various operative components thereof to be mounted on a variety of different vehicles. As such, the liquid dispensing assembly of the present invention may be made available to consumers as a kit assembly. It is also emphasized that with little or no structural modification, the liquid dispensing assembly of the present invention may be readily adaptable for use on vehicles other than a cycle-type vehicle, of the type set forth above.

Accordingly, the liquid dispensing assembly of the present invention comprises the aforementioned one or more nozzle assemblies. In at least one preferred embodiment, two nozzle assemblies are mounted on the vehicle so as to direct streams of water outwardly therefrom in substantially different directions. As such, one of the aforementioned nozzle assemblies may be mounted on the handle bar or other steering mechanism of the vehicle so as to face outwardly in a substantially forward direction. The one other nozzle assembly may be connected to the frame of the bicycle or other vehicle so as to direct liquid streams outwardly, substantially from the rear of the vehicle.

As also to be explained in greater detail hereinafter at least one of the aforementioned nozzle assemblies may be selectively positioned or oriented relative to the vehicle, such that the liquid streams issuing therefrom may be specifically directed or "aimed" during their use. Similarly, each of the one or more nozzle assemblies may be selectively and repeatedly activated so as to direct separate liquid streams outwardly therefrom as desired and intended by an operator of the vehicle. The ability to independently activate each of the nozzle assemblies and the enhanced versatility of selectively positioning at least one of the nozzle assemblies significantly enhances the entertainment value of the liquid dispensing assembly. In addition, the ability of the vehicle operator to control the liquid dispensing assembly, in the manner described herein, facilitates participation of the present invention, as well as the vehicle on which it is mounted, in numerous, unique games, competitions, sports activities, etc.

Accordingly, the selective positioning and activation of the one or more nozzle assemblies is quickly and efficiently accomplished through the provision of a control assembly which preferably includes an activating assembly and a positioning assembly. Also, in at least one preferred embodiment both the activating assembly and the positioning assembly are hand operated and disposed and structured to be manipulated by opposite hands of the vehicle operator without requiring the operator to remove his or her hands from the handle bars or other steering mechanism associated with the vehicle. As such, the operator can continue to operate the vehicle safely by maintaining the hand positions in a conventional location such as on the handle bars and/or hand grips associated therewith so as to concurrently steer the vehicle and activate/position the one or more nozzle assemblies.

At least one alternate embodiment of the present invention envisions a positioning assembly comprising an electronic tracking display headset structured to be disposed about the head of the vehicle operator, such as, for example, glasses or goggles. The electronic tracking display headset functions to position one or more nozzle assemblies based upon the positioning of the headset which is controlled by the vehicle operator by repositioning their head.

The liquid dispensing assembly of the present invention further includes a liquid supply also mounted on the vehicle in a convenient location. The liquid supply preferably comprises at least a primary reservoir and, in an additional preferred embodiment, at least a secondary reservoir. These reservoirs may be in the form of containers capable of storing water or other liquid therein in a convenient location on the bicycle or other type of vehicle. Moreover, the one or more reservoirs are disposed, dimensioned and configured to not interfere with the normal operation of the vehicle or come in to conflict with the normal positioning and movement of the operator.

As set forth above water or other liquid issuing from the one or more nozzle assemblies is subjected to an at least minimal amount of driving force or pressure. As a result, the issuing streams are directed outwardly a significant distance from the vehicle on which the dispensing assembly is mounted. Therefore the present invention also comprises a "drive" assembly including a plurality of operative components which are cooperatively structured to force liquid flow from the liquid supply to the one or more nozzle assemblies. The liquid is delivered under sufficient pressure to produce the aforementioned streams of water issuing from the one or more nozzle assemblies.

The drive assembly, in at least one preferred embodiment, includes a pump mechanism connected in fluid communication with the liquid contained on the interior of at least one of the primary or secondary reservoirs structured and disposed to transfer the liquid from at least one or more reservoirs to one or more nozzle assemblies. The pump mechanism is mechanically driven or electrically powered by means of a drive mechanism, which may be structured to operate based on the movement of the vehicle and/or independently thereof. As one of example, the aforementioned drive mechanism may comprise an electro-mechanical type of mechanism, for example, a mechanical/electrical generator structure attached to some movable portion of the bicycle or other vehicle, such as by being connected to the one or more wheels thereof. As such, movement of the bicycle would cause a driving force being directed to the drive mechanism, wherein such mechanical force could be transformed to electrical energy so as to power the aforementioned pump mechanism. Similarly, the aforementioned control assembly, including the activating assembly and the positioning assembly could also be electrically powered by energy derived from the drive mechanism.

It is emphasized that the aforementioned drive assembly could take a variety of different forms other than that described. For example, the aforementioned pump mechanism could be driven from a self contained power source, such as a battery pack or the like, rather than converting the mechanical energy derived from the movement of the vehicle on which the liquid dispensing assembly is mounted. Similarly, the activating assembly and the positioning assembly could include separate independently contained battery packs for operation thereof. Alternately a single self contained electrical source of energy may be mounted on the vehicle so as to provide electrical energy to all of the operative power components.

Therefore it is again emphasized that the drive assembly of the present invention is not limited to any specific type of mechanical, electrical, electro-mechanical drive mechanism, etc. Moreover, regardless of the type of drive mechanism utilized to provide adequate driving force to the liquid being dispensed, it may be located at any of a variety of locations on the vehicle. It is also contemplated that the aforementioned drive assembly may take the form of a pressurized fluid, such as air or the like connected to the primary or secondary reservoirs so as to pressurized the interior thereof and thereby force the liquid being dispensed along the proper liquid carrying conduits which serves to interconnect the one or more reservoirs to the one or more nozzle assemblies. Yet another alternative is envisioned wherein the drive mechanism operates to pressurize the liquid supply while the vehicle is in motion, and the liquid supply is structured to retain this pressure to allow the aforementioned streams of water to be issued from the nozzles while the vehicle is at rest, until the retained pressure is released.

Accordingly, the present invention is directed to a liquid dispensing assembly which can be quickly, efficiently and safely adapted for use in combination with a bicycle or other recreational type vehicle, which serves to enhance the enjoyment and entertainment value of utilizing the vehicle.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
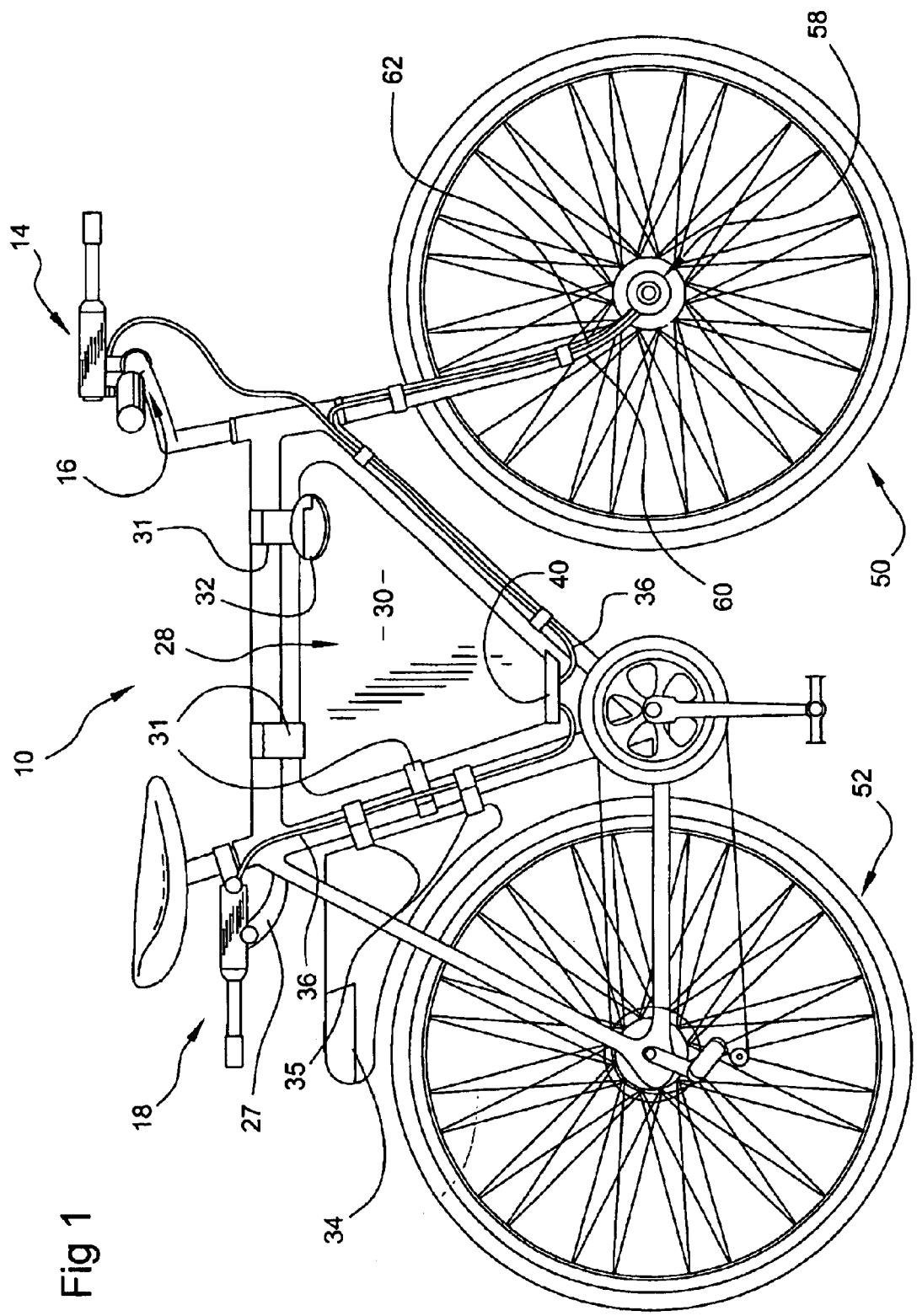
FIG. 1 is a side view of a liquid dispensing assembly of the present invention assembled and mounted on a vehicle such as a bicycle.
Figure 2:
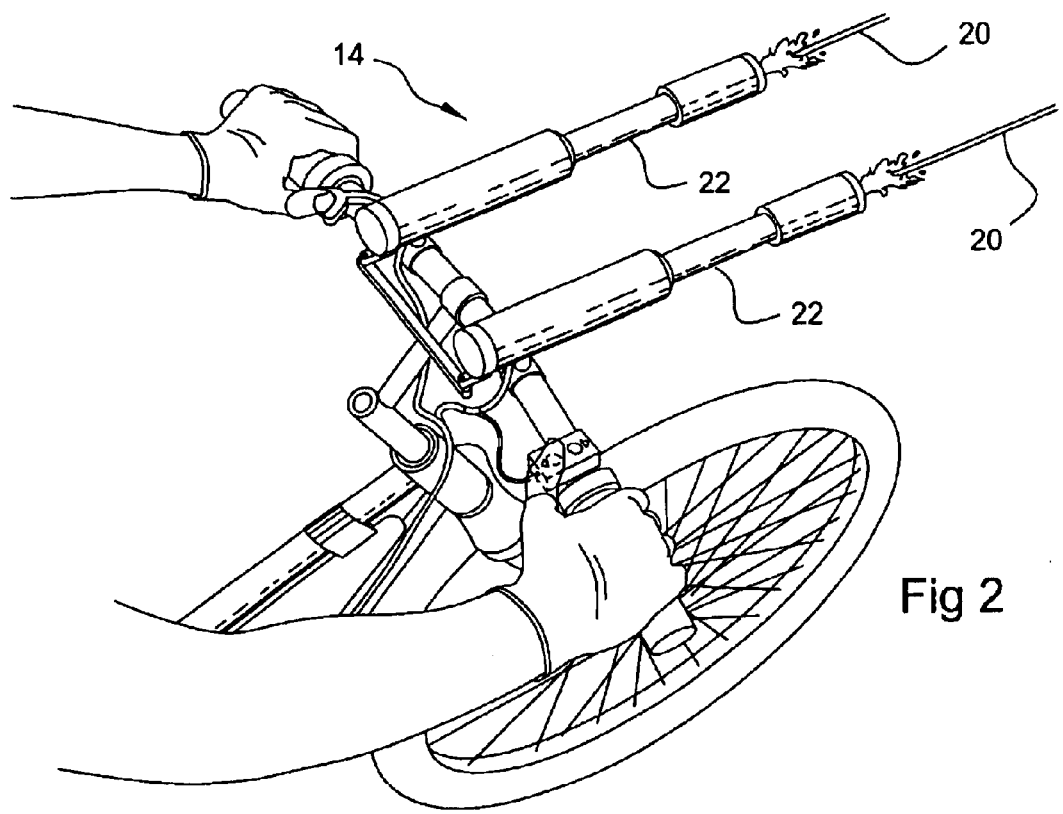
FIG. 2 is a perspective view in partial cutaway of one preferred embodiment of the liquid dispensing assembly of the present invention, including at least one nozzle assembly in an operative mode.
Figure 3:
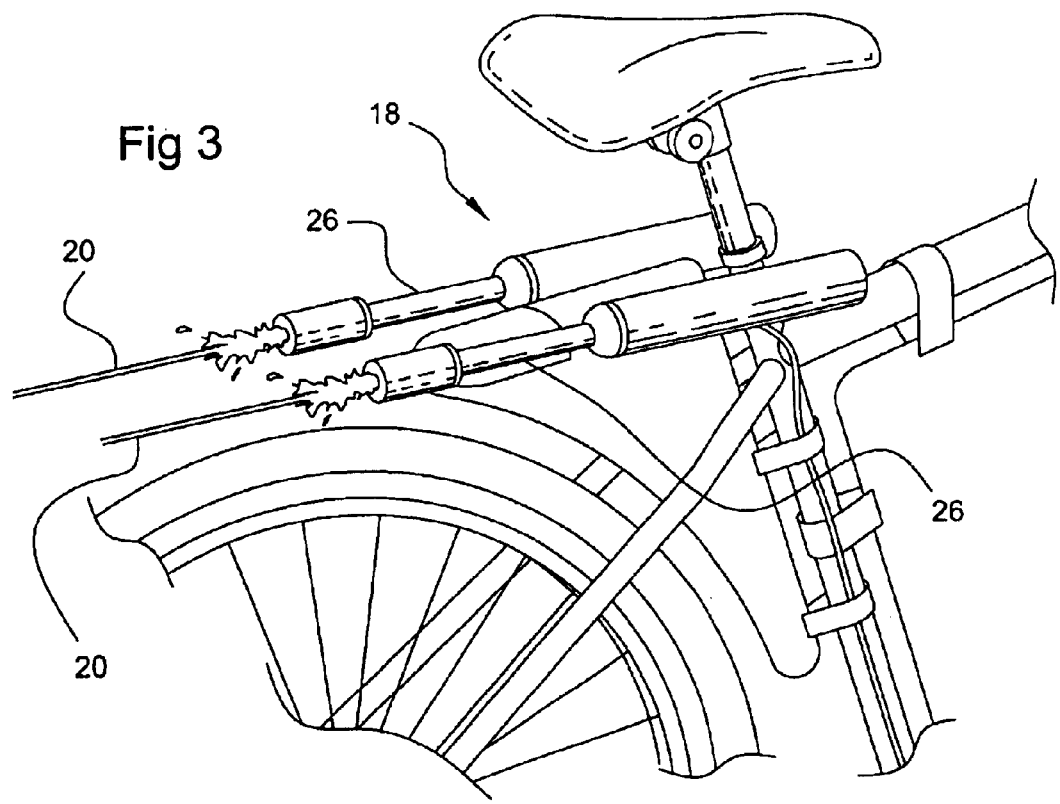
FIG. 3 is a perspective view in partial cutaway of another preferred embodiment the liquid dispensing assembly of the present invention including one other nozzle assembly mounted on the vehicle in a different location from the embodiment of FIG. 2.
Figure 4:
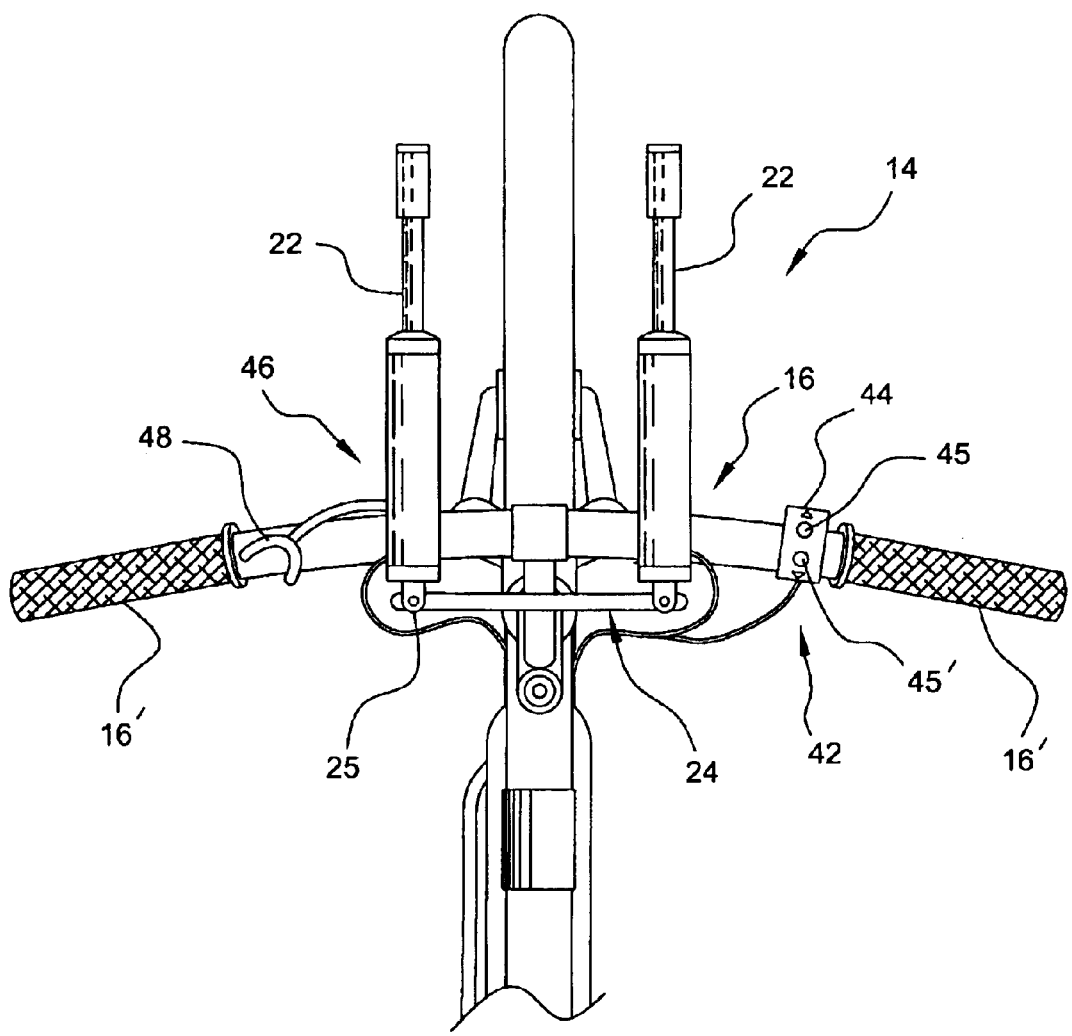
FIG. 4 is a top plan view in partial cut away of the embodiment of FIG. 2.
Figure 5:
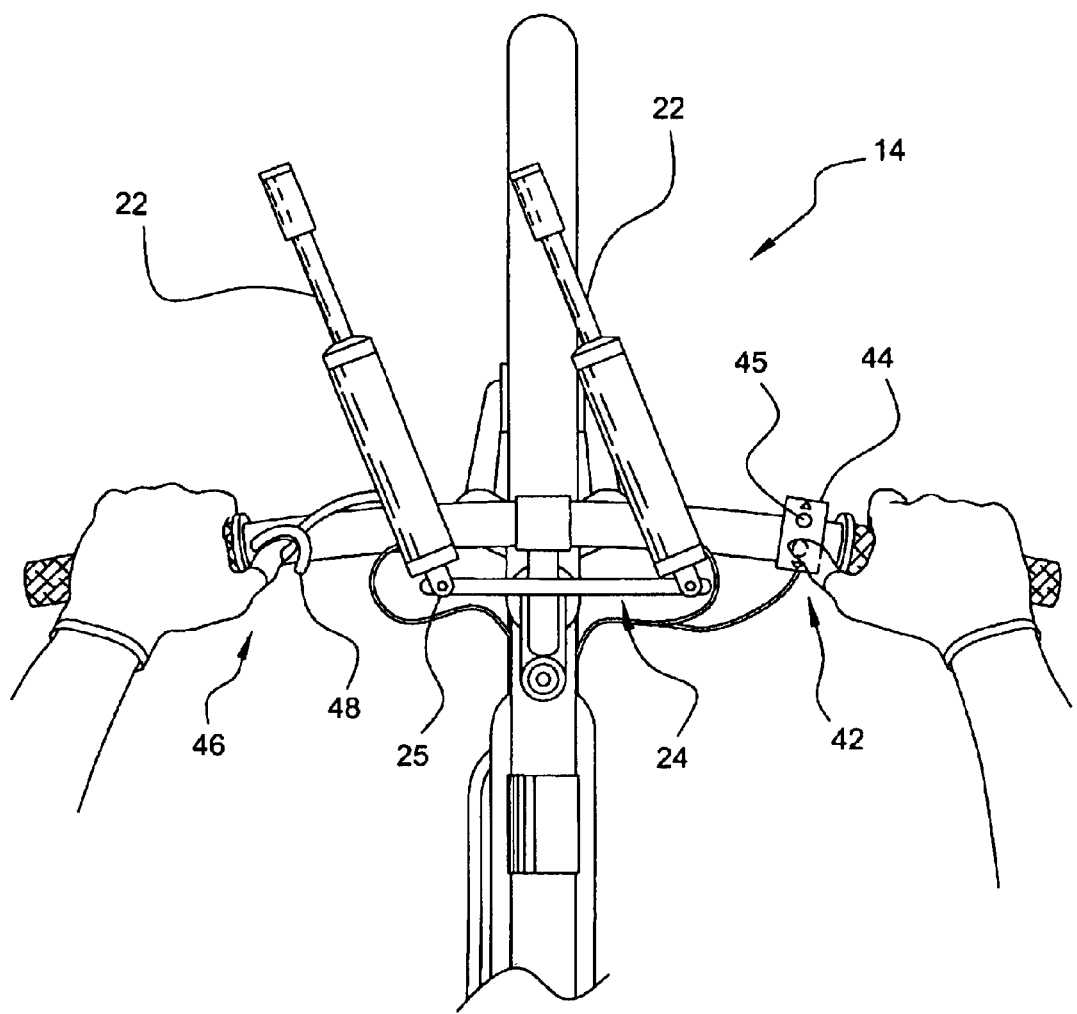
FIG. 5 is a top plan view of the nozzle assembly of the embodiments of FIGS. 2 and 4 wherein the orientation of the nozzle assembly is being selectively changed.

As shown in the accompanying drawings, the present invention is directed to a liquid dispensing assembly demonstrated by an array of "squirt guns" mounted on a bicycle or other type of vehicle generally indicated as 10 in FIG. 1. In its various preferred embodiments, the liquid dispensing assembly may be fixedly attached to the vehicle 10, or may be easily connected to and removed from the vehicle 10.

Figure 7:
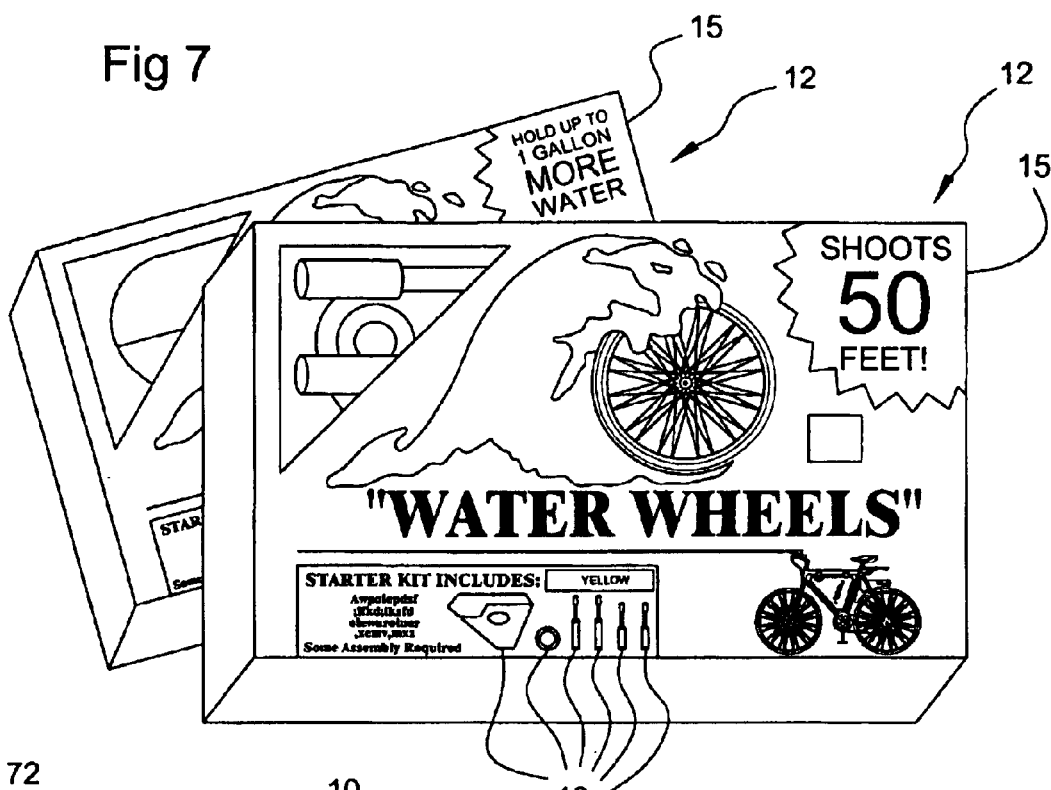
FIG. 7 is a perspective view of the liquid distribution assembly of the present invention embodied in a kit form and being unassembled and unattached to the vehicle of the embodiment of FIG. 1.

Accordingly, in the latter described embodiment, the liquid dispensing assembly may be made available as a kit assembly 12 as depicted in FIG. 7. As such, the various operative components of the kit assembly 12, pictorially represented as 13, may be collectively packaged in an unassembled array, in any of a variety of appropriately structured containers 15. When purchased or otherwise obtained the various operative components may be easily connected to the vehicle 10, generally the manner shown in FIG. 1. It is emphasized that the liquid dispensing assembly of the present invention may be adapted, with little or no structural modification, to be mounted on and used in combination with a variety of different vehicles other than the cycle-type of vehicle 10 shown in FIG. 1.

More specifically, the liquid dispensing assembly of the present invention comprises at least one nozzle assembly generally indicated as 14 wherein, in the preferred embodiment of FIG. 1, the nozzle assembly 14 is removably attached to a front or leading portion of the vehicle 10 such as on or about the steering mechanism or handle bars 16.

Naturally, the nozzle assembly 14 can be mounted on a variety of other portions of the frame of the vehicle 10 and is not limited to removable or fixed securement to the handle bars assembly or other steering mechanism 16.

Another preferred embodiment of the subject liquid dispensing assembly comprises at least one other nozzle assembly generally indicated as 18. In order to further enhance the overall versatility and enjoyment of operating the vehicle 10 in combination with the liquid dispensing assembly of the present invention, the nozzle assemblies 14 and 18 are preferably mounted on the spaced apart portions of the vehicle 10. As such, streams of water 20 can be directed outwardly from the vehicle 10 in substantially different directions. While not limited to the specific positioning demonstrated in FIGS. 1 through 5, the nozzle assemblies 14 and 18 may be disposed to direct streams of water 20 outwardly from substantially both the front and rear of the vehicle.

As also shown in FIGS. 1 through 5, each of the nozzle assemblies 14 and 18 preferably include a plurality of nozzle members. More specifically, nozzle assembly 14 includes a pair of nozzle members 22 mounted on the steering mechanism 16 and being interconnected to one another by a mounting assembly 24 at least partially depicted in FIGS. 4 and 5 and schematically represented in FIG. 6. Similarly, the other nozzle assembly 18 includes two nozzle members 26 mounted on the frame of the vehicle 10 by an adjustable or fixed support bracket or like structure 27. Each of the nozzle members 22 and 26 are structured to produce independent streams of liquid 20 which are directed outwardly therefrom and from the vehicle 10 with sufficient force that the streams 20 travel at least a minimal distance away from the vehicle.

In order to facilitate repeated and substantially prolonged operation of the liquid dispensing assembly of the present invention, the operative components thereof further include a liquid supply generally indicated as 28. Liquid supply 28 includes at least a primary reservoir 30 comprising a container designed to hold water or other liquid therein. Further a closure member 32 is removably secured to a fill opening (not shown) to facilitate rapid and effective refilling of the primary reservoir 30. The primary reservoir 30 is fixedly or removably connected to the frame of the vehicle, preferably in the position shown in FIG. 1, by one or more connectors or attachment members 31.

Figure 8:
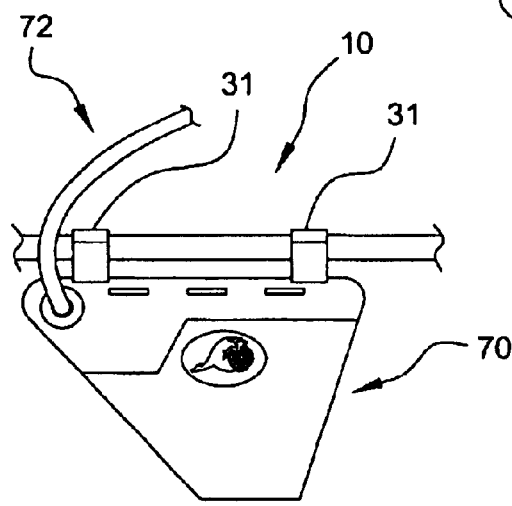
FIG. 8 is a perspective view in partial cutaway of another preferred embodiment of the liquid dispensing assembly of the present invention including a delivery conduit associated with a liquid supply.
Figure 9:
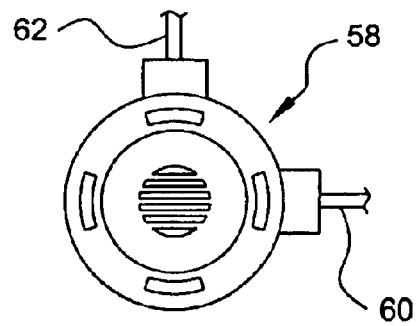
FIG. 9 is a front view in partial cutaway of one preferred embodiment of a drive assembly for forcing liquid flow through the liquid distribution assembly of the present invention.
Figure 10:
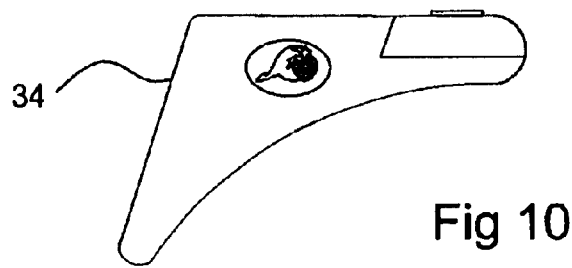
FIG. 10 is a perspective view in partial cutaway illustrating a secondary reservoir of the present invention.

An alternate embodiment of the liquid supply 70 is illustrated in FIG. 8. As the figure shows, this embodiment further comprises a delivery conduit 72 connected to the liquid supply 70 which is structured and disposed to establish fluid communication between the liquid supply 70 and the vehicle operator, so the operator may refresh himself or herself with the liquid contained therein, such as, by taking a drink of the liquid or directing the liquid over one or more parts of the operator's body. In one embodiment, the vehicle operator may initiate the flow of liquid from the delivery conduit 72 utilizing a manually actuated pumping mechanism.

Also, in at least one additional preferred embodiment of the present invention the liquid supply includes a secondary reservoir 34 secured to the vehicle independently of the primary reservoir 30 as by connectors or attachment structures 35. Supply lines or conduits 36 establish fluid communication between at least the primary reservoir 30, and of course the liquid contained therein, with at least one, but preferably both of the nozzle assemblies 14 and 18. Therefore, the secondary reservoir 34 may be connected in fluid communication with the interior of the primary reservoir 30 so as to increase the overall liquid capacity of the subject dispensing assembly. Alternatively, the secondary reservoir 34 may be connected in fluid communication with one of the two nozzle assemblies 14 and 18, preferably the other nozzle assembly 18, such that each of the nozzle assemblies 14 and 18 are supplied with liquid from a different one of the reservoirs 30 and 34. As explained in greater detail hereinafter at least one drive assembly 40 is interconnected between the liquid supply, including at least one of the reservoirs 30 or 34, and the nozzle assemblies 14 and 18. Therefore, liquid will be delivered from the one or more reservoirs 30 or 34 through the supply conduits 36 to the nozzle assemblies 14 and 18 under sufficient pressure to facilitate the formation of the outwardly directed liquid streams 20.

As set forth above, water or other liquid issuing from the one or more nozzle assemblies 14 and 18 is subjected to an at least minimal amount of driving force or pressure. As a result, the issuing liquid streams 20 are directed outwardly a significant distance from the vehicle 10 on which the dispensing assembly is mounted. Therefore, as indicated above, the present invention also comprises a drive assembly 40 including a plurality of operative components which are cooperatively structured to force liquid flow from the liquid supply 28 to the one or more nozzle assemblies 14 and 18. The liquid is delivered under sufficient pressure to produce the aforementioned streams of water 20 issuing from the one or more nozzle assemblies 14 and 18.

Figure 6:
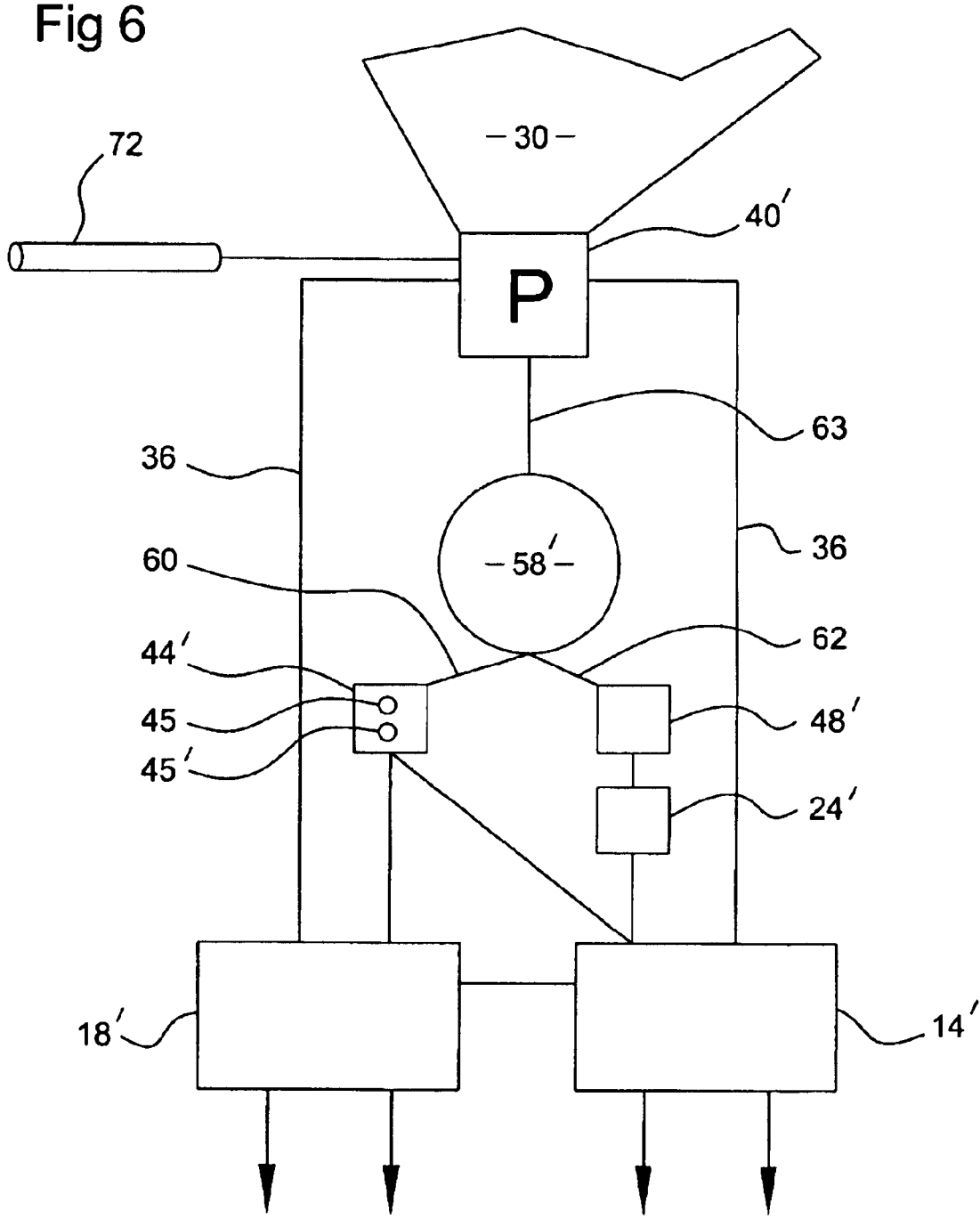
FIG. 6 is a schematic representation of certain operative components of the present invention.

The drive assembly 40, in at least one preferred embodiment, includes a pump mechanism 40' connected in fluid communication with the liquid contained on the interior of at least the primary reservoir 30 structured and disposed to transfer the liquid from at least one or more of the reservoirs to one or more nozzle assemblies 14' and 18', as illustrated schematically in FIG. 6. The drive assembly 40 may be mechanically driven or electrically powered by means of a drive mechanism 58, which may be structured to operate based on the movement of the vehicle and/or independently thereof. As one example, the aforementioned drive mechanism 58 may comprise an electro-mechanical type of mechanism, for example, a mechanical/electrical generator structure attached to some movable portion of the vehicle or other vehicle, such as by being connected to the one or more wheels 50 or 52 thereof. As such, movement of the vehicle would cause a driving force being directed to the drive mechanism 58', wherein such mechanical force could be transformed to electrical energy so as to power the aforementioned pump mechanism 40' via power connection 63.

With primary reference to FIGS. 2 through 5, one feature of the present invention includes the provision of a control assembly which serves to selectively activate one or both of the nozzle assemblies 14 and 18 as well as effectively vary the positioning and/or orientation of at least one of the nozzle assemblies, such as 14. More specifically, the control assembly includes an activating assembly generally indicated as 42 and preferably including a hand operated activating device 44. In addition, the control assembly includes a positioning assembly generally indicated as 46 and including a hand operated positioning device 48. Both the activating device 44 and the positioning device 48 are preferably mounted on the handle bars or other steering mechanism 16 associated with the vehicle 10. Further, concurrent operation of the vehicle and the activation and positioning of the one or more nozzle assemblies 14 and 18 may be efficiently and safely accomplished by the disposing of the activating device 44 and the positioning device 48 substantially adjacent and in communication with the conventional operator hand positions on the handle bars 16 as clearly demonstrated in FIG. 5. As such, the operator is allowed to keep his or her hands in a safe position when traveling on the vehicle. Concurrently, the operator is allowed to both activate and/or position the nozzle assembly 14 and/or the other nozzle assembly 18.

More specifically, the activating assembly 42 includes the hand operated activating device 44 including two operative buttons or control members 45 and 45'. The hand operated activating device 44 may also include appropriate indicators clearly setting forth that one of the control members or buttons 45 is for the activation of the nozzle assembly 14 and the other of the control members 45' is for the activation of the other nozzle assembly 18. Either or both of the activating device 44 and the positioning device 48 may be electrically powered, wherein the enabling electrical energy may be derived from a self contained battery source or, as in the embodiment illustrated in FIG. 6, the activating device 44' and the positioning device 48' may be electrically powered by energy derived from the drive mechanism 58' via power connections 60 and 62, respectively. In at least on embodiment, however, the activating assembly 42 may comprise a manually operated pumping actuator.

Similar to the activating assembly 42, the positioning assembly 46 includes the hand operated positioning device 48 disposed immediately adjacent and in communicating relation with an operator's hand position or grip 16'. The positioning assembly 46 is connected to the aforementioned mounting assembly 24 which is shown at least in part of FIGS. 4 and 5 and schematically represented as 24' in FIG. 6. It should be apparent that the mounting assembly 24 may comprise any type of mechanical or electrically powered drive motor and further includes the interconnecting mechanical linkage 25. The mechanical linkage 25 may also take a variety of different structural configurations and serves to interconnect the nozzle members 22 to one another. Therefore, the relative movement or orientation of the nozzle members is coordinated to the extent that each of the nozzle members 22 are continuously positioned or oriented in a substantially common direction as clearly indicated in both FIGS. 4 and 5. Therefore, hand manipulation of the positioning device 48 serves to selectively orient both of the nozzle members 22 in a coordinated manner so as to face any of a variety of different directions along which the liquid streams 20 will be directed, as desired by the vehicle operator. In an alternate embodiment, the positioning device 48 may be electronically actuated via a thumb lever control. In the preferred embodiments of FIGS. 1 through 5, the positioning assembly 46 is operatively connected only to the nozzle assembly 14. However additional preferred embodiments of the present invention can have the same or additional positioning assembly connected for selective orientation of the other nozzle assembly, 18 as should be apparent.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A liquid dispensing assembly structured to be mounted on a vehicle, said liquid dispensing assembly comprising:

a) a liquid supply mounted on the vehicle, b) at least one positionable nozzle assembly connected in fluid communication with said liquid supply and structured to direct at least one liquid stream outwardly from the vehicle, c) a control assembly structured to operate said positionable nozzle assembly and including an activating assembly and a positioning assembly, and d) both said activating assembly and said positioning assembly mounted on a steering mechanism of the vehicle in spaced relation to said positionable nozzle assembly and in adjacent, communicating relation to conventional operator hand positions on the steering mechanism.

2. A liquid dispensing assembly as recited in claim 1 wherein said positioning assembly and said activating assembly are disposed in sufficiently spaced apart relation to be concurrently operable by different hands of a vehicle operator.

3. A liquid dispensing assembly as recited in claim 1 further comprising a mounting assembly movably connecting said positionable nozzle assembly to the vehicle.

4. A liquid dispensing assembly as recited in claim 3 wherein said positioning assembly is operatively connected to said mounting assembly and cooperatively structured therewith to selectively vary an orientation of said positionable nozzle assembly and said liquid stream associated therewith relative to the vehicle.

5. A liquid dispensing assembly as recited in claim 4 wherein said positioning assembly comprises a hand operated positioning device connected to said mounting assembly and disposed on the vehicle steering mechanism.

6. A liquid dispensing assembly as recited in claim 5 where in said activating assembly comprises a hand operated activating device connected to said positionable nozzle assembly and mounted on the vehicle steering mechanism in spaced relation to said hand operated positioning device.

7. A liquid dispensing assembly as recited in claim 6 wherein said hand operated activating device is cooperatively structured with said positionable nozzle assembly to selectively issue streams of liquid therefrom when said positionable nozzle assembly is disposed in any one of a plurality of different orientations relative to the vehicle.

8. A liquid dispensing assembly as recited in claim 4 wherein said positionable nozzle assembly comprises a plurality of nozzle members each structured to issue a separate liquid stream therefrom, said mounting assembly interconnecting said plurality of nozzle members and structured to facilitate coordinated movement thereof relative to the vehicle.

9. A liquid dispensing assembly as recited in claim 8 wherein said coordinated movement comprises each of said plurality of nozzle members disposed in a substantially common direction.

10. A liquid dispensing assembly as recited in claim 1 further comprising at least two nozzle assemblies mounted on the vehicle and connected in fluid communication with said liquid supply, each of said two nozzle assemblies structured to direct at least one liquid stream outwardly from the vehicle in a substantially different direction than the other of said two nozzle assemblies.

11. A liquid dispensing assembly as recited in claim 10 wherein said two nozzle assemblies are disposed to respectively direct corresponding liquid streams outwardly from a front portion and a rear portion of the vehicle.

12. A liquid dispensing assembly as recited in claim 10 wherein said activating assembly is operatively connected to each of said two nozzle assemblies and structured for independent or concurrent operation thereof.

13. A liquid dispensing assembly as recited in claim 12 wherein said activating assembly comprises a hand operated activating device connected to each of said nozzle assemblies and mounted on the vehicle steering mechanism in spaced relation to said positioning assembly.

14. A liquid dispensing assembly as recited in claim 13 wherein each of said two nozzle assemblies comprises a plurality of nozzle members each structured to issue a separate liquid stream therefrom.

15. A liquid dispensing assembly as recited in claim 12 wherein said liquid supply comprises a primary reservoir connected in fluid communication with at least one of said two nozzle assemblies.

16. A liquid dispensing assembly as recited in claim 15 wherein said liquid assembly comprises a secondary reservoir.

17. A liquid dispensing assembly as recited in claim 16 wherein said secondary reservoir is connected in fluid communication with said primary reservoir.

18. A liquid dispensing assembly as recited in claim 16 wherein said primary reservoir and said secondary reservoir are connected in fluid communication with different ones of said two nozzle assemblies.

19. A liquid dispensing assembly as recited in claim 16 wherein one of said primary and secondary reservoirs are removably mounted on the vehicle substantially below and forward of a vehicle operator and the other of said primary and secondary reservoirs are removably mounted substantially below and rearwardly of the vehicle operator.

20. A liquid dispensing assembly as recited in claim 1 further comprising a delivery conduit connected to said liquid supply and disposed and structured to establish fluid communication between said liquid supply and a vehicle operator.

21. A kit assembly structured to direct liquid flow outwardly from a vehicle, said kit assembly comprising:

a) a plurality of operative components removably connected to the vehicle and cooperatively structured to selectively direct one or more liquid streams in a predetermined direction from the vehicle; said plurality of operative components including;

at least one positionable nozzle assembly connected in fluid communication with a liquid supply, an activating assembly and a positioning assembly attachable to a steering mechanism of the vehicle in adjacent, communicating relation to conventional hand positions of a vehicle operator, a mounting assembly operatively connected to both said positioning assembly and said one positionable nozzle assembly and structured to selectively vary an orientation of said one positionable nozzle assembly and a direction of any corresponding liquid stream issuing therefrom relative to the vehicle, said liquid supply comprising at least one liquid reservoir structured to contain liquid therein and connected in fluid communication with said one positionable nozzle assembly, and b) said activating assembly connected to said one positionable nozzle assembly and cooperatively structured therewith to selectively direct said one or more liquid streams therefrom when said one positionable nozzle assembly is disposed in any one of a plurality of orientations relative to the vehicle.

22. A kit assembly as recited in claim 21 wherein said plurality of operative components further include a delivery conduit connected in fluid communication with said liquid supply, said delivery conduit dimensioned and structured to deliver liquid from said liquid supply to a vehicle operator.

23. A kit assembly as recited in claim 21 wherein said plurality of operative components further include one other nozzle assembly connected in fluid communication with said liquid supply, said activating assembly connected to and cooperatively structured with said other nozzle assembly to selectively issue at least one liquid stream therefrom.

24. A kit assembly as recited in claim 23 wherein said activating assembly is structured for independent and concurrent operation of said one positionable nozzle assembly and said one other nozzle assembly.

25. A kit assembly as recited in claim 23 wherein each of said nozzle assemblies comprises a plurality of nozzle members, each nozzle member structured to issue a separate liquid stream therefrom.

26. A kit assembly as recited in claim 21 wherein said activating assembly comprises a hand operated activating device connected to said one positionable nozzle assembly and mounted on the vehicle steering mechanism in spaced relation to said positioning assembly.

27. A kit assembly as recited in claim 26 wherein said hand operated activating device is cooperatively structured with said one positionable nozzle assembly to selectively issue streams of liquid therefrom when said positionable nozzle assembly is disposed in any of a plurality of different orientations relative to the vehicle.

28. A kit assembly as recited in claim 27 wherein said positioning assembly comprises a hand operated positioning device.

29. A kit assembly as recited in claim 28 wherein said hand operated activating device and said hand operated positioning device are disposed on the steering mechanism of the vehicle in adjacent communicating relation to different conventional operator hand positions on the steering mechanism.

30. A kit assembly as recited in claim 21 wherein said liquid supply comprises a plurality of liquid reservoirs.

31. A liquid dispensing assembly structured to be mounted on a vehicle, said liquid dispensing assembly comprising:
   a) a liquid supply mounted on the vehicle,
   b) a plurality of nozzle assemblies mounted on the vehicle and connected in fluid communication with said liquid supply and structured to direct a plurality of liquid streams outwardly from the vehicle,
   c) a drive assembly structured and disposed to transfer a liquid from said liquid supply to said plurality of nozzle assemblies;
   d) a hand operated activating device structured to allow a vehicle operator to activate said drive assembly,
   e) a hand operated positioning device structured to allow the vehicle operator to direct at least one of said nozzle assemblies, and
   f) both said hand operated activating device and said hand operated positioning device mounted on a steering mechanism of the vehicle in spaced relation to at least one of said nozzle assemblies and in adjacent, communicating relation to conventional operator hand positions on the steering mechanism.

32. A liquid dispensing assembly structured to be mounted on a vehicle, said liquid dispensing assembly comprising:
   a) a liquid supply mounted on the vehicle,
   b) at least one positionable nozzle assembly mounted on the vehicle and connected in fluid communication with said liquid supply and structured to direct a plurality of liquid streams outwardly from the vehicle,
   c) said positionable nozzle assembly comprising a plurality of nozzle members each structured to issue a separate liquid stream therefrom,
   d) a drive assembly structured and disposed to transfer a liquid from said liquid supply to said positionable nozzle assembly,
   e) a hand operated activating device structured to allow a vehicle operator to activate said drive assembly,
   f) a mounting assembly movably connecting said plurality of nozzle members to the vehicle,
   g) said mounting assembly interconnecting said plurality of nozzle members and structured to facilitate coordinated movement thereof relative to the vehicle, wherein said coordinated movement comprises each of said plurality of nozzle members disposed in a substantially common direction, and
   h) both said hand operated activating device and said mounting assembly mounted on a steering mechanism of the vehicle in spaced and communicating relation to conventional operator hand positions on the steering mechanism.

33. A liquid dispensing assembly as recited in claim 32 further comprising a positioning assembly operatively connected to said mounting assembly and cooperatively structured therewith to selectively and collectively vary an orientation of each of said plurality of nozzle members and each said liquid stream corresponding therewith relative to the vehicle.

34. A liquid dispensing assembly as recited in claim 33 wherein said positioning assembly comprises a hand operated positioning device connected to said mounting assembly and disposed on the vehicle steering mechanism.

* * * * *